United States Patent
Duan et al.

(10) Patent No.: US 10,265,675 B2
(45) Date of Patent: Apr. 23, 2019

(54) SOLID POWDER REACTOR

(71) Applicant: Shandong Borui New Material Technology Co., Ltd, Weifang, Shandong (CN)

(72) Inventors: Pengxuan Duan, Beijing (CN); Ying Li, Beijing (CN); Hongyu Wang, Qingzhou (CN); MingChen Yan, Qingzhou (CN)

(73) Assignee: Shandong Borui New Material Technology Co., Ltd., Qingzhou (CN)

( * ) Notice: Subject to any disclaimer, the term of this patent is extended or adjusted under 35 U.S.C. 154(b) by 26 days.

(21) Appl. No.: 15/595,943

(22) Filed: May 16, 2017

(65) Prior Publication Data

US 2017/0246612 A1    Aug. 31, 2017

(30) Foreign Application Priority Data

Jul. 12, 2016   (CN) .................... 2016 2 0732848 U

(51) Int. Cl.
  *B01J 8/00*   (2006.01)
  *B01J 8/10*   (2006.01)
  *B01J 19/00*  (2006.01)
  *B01J 19/18*  (2006.01)

(52) U.S. Cl.
  CPC ........... *B01J 19/1812* (2013.01); *B01J 8/003* (2013.01); *B01J 8/10* (2013.01); *B01J 19/0013* (2013.01); *B01J 2208/0007* (2013.01); *B01J 2208/00044* (2013.01); *B01J 2208/00176* (2013.01); *B01J 2208/00203* (2013.01); *B01J 2208/00867* (2013.01); *B01J 2208/00982* (2013.01); *B01J 2219/002* (2013.01); *B01J 2219/00076* (2013.01); *B01J 2219/00213* (2013.01); *B01J 2219/00231* (2013.01); *B01J 2219/00238* (2013.01); *B01J 2219/182* (2013.01)

(58) Field of Classification Search
  CPC ........ B01J 19/00; B01J 19/18; B01J 19/1812; B01J 19/00049; B01J 19/00051; B01J 19/00074; B01J 19/00076; B01J 19/00121; B01J 19/0013
  See application file for complete search history.

(56) References Cited

U.S. PATENT DOCUMENTS 7,815,889 B2 *  10/2010  Luan ................... C04B 11/0283
                                              423/636

* cited by examiner

*Primary Examiner* — Natasha E Young
(74) *Attorney, Agent, or Firm* — Alan D. Kamrath; Kamrath IP Lawfirm, P.A.

(57) ABSTRACT

A solid powder reactor includes: a reaction kettle, including a hollow kettle body and covers; an agitating device, including an agitating shaft and blades, wherein the agitating shaft is arranged in the kettle body and the blades are fixed on the agitating shaft; and a heating system, including a kettle body heater and an agitating heater, wherein the kettle body heater is fixed on the kettle body and the agitating heater is arranged on the agitating device. While the agitating device and the kettle body are driven to agitate, by a driving device fixedly arranged outside the reaction kettle, the heating system heats materials in the reactor. The present invention is applicable to solid reaction of solid powders. The materials containing attached water or not are both feasible, and the materials can directly enter the reactor and react. Compared with conventional solid reactors, the present invention increases the production efficiency.

14 Claims, 1 Drawing Sheet

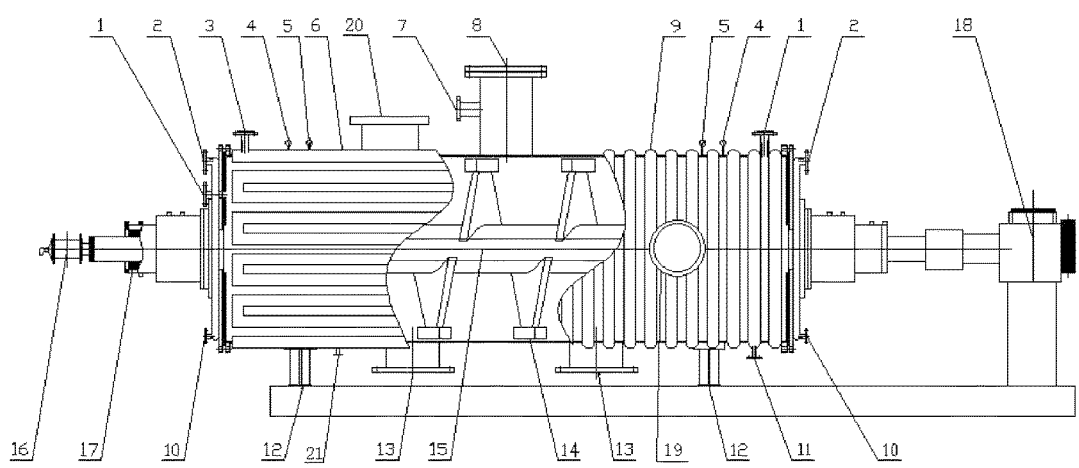

SOLID POWDER REACTOR

CROSS REFERENCE OF RELATED APPLICATION

The application claims priority under 35 U.S.C. 119(a-d) to CN 201620732848.8, filed Jul. 12, 2016.

BACKGROUND OF THE PRESENT INVENTION

Field of Invention

The present invention relates to a field of reactor, and more particularly to a solid powder reactor.

Description of Related Arts

The conventional solid reactor has three types. The first type is the vertical reactor. The solid blocks or blocks obtained through pressing the solid powders are loaded into the vertical reactor; then steam is introduced into the reactor, and the blocks are heated and reacted; after reaction is finished, the blocks are moved out of the reactor and dried, or dried in the reactor through introducing hot dry air into the reactor. The second type is the horizontal reactor. The solid blocks or blocks obtained through pressing the solid powders are loaded into the horizontal reactor through a small car; then steam is introduced into the reactor, and the blocks are heated and reacted; after reaction is finished, hot dry air is introduced into the reactor, or the blocks are moved out of the reactor and dried. The vertical reactor and the horizontal reactor have characteristics that materials in the reactor are still, and the material blocks have a relatively large volume and transfer heat from inside to outside with a slow heat transfer rate, causing the slow reaction rate, the slow drying rate and the low efficiency. Moreover, the vertical reactor and the horizontal reactor are merely applicable to material blocks, not applicable to material powders, especially the material powders containing certain attached water. The third type of reactor is to grind the material blocks into fine powders, then add into the aqueous solution to form a suspension liquid, and heat the suspension liquid for reacting. After reaction is finished, the liquid is moved out of the reactor, and then processed with filtering, dehydration and drying. For the third type of reactor, the solid content of the suspension liquid is about 30%, the production efficiency is low, the production process is complex, the equipment investment is large, and the production cost is high.

For above defects, after a long time of research and practice, the present invention is provided by the inventors. The present invention provides a reactor which is able to directly utilize the untreated industrial solid wastes to process a solid reaction, without pressing the material powders into blocks. The present invention is applicable to the solid reaction of the solid powders. The materials containing attached water or not are both feasible, and the materials can directly enter the reactor and react.

SUMMARY OF THE PRESENT INVENTION

An object of the present invention is to provide a solid powder reactor, so as to solve above technical defects.

A solid powder reactor comprises:

a reaction kettle, comprising a kettle body which is hollow and covers;

an agitating device, comprising an agitating shaft and blades, wherein: the agitating shaft is arranged in the hollow kettle body; and the blades are fixed on the agitating shaft; and a heating system, comprising a kettle body heater and an agitating heater, wherein: the kettle body kettle is fixed on the hollow kettle body; and the agitating heater is arranged on the agitating device;

wherein: while the agitating device and the hollow kettle body are driven to agitate by a driving device fixedly arranged outside the reaction kettle, the heating system heats materials inside the reactor.

Preferably, the agitating shaft and the blades are hollow, for introducing a heating medium thereinto.

Preferably, the blades are uniformly arranged on two sides of the agitating shaft, at an angle of 40°-50° to an axial direction of the agitating shaft.

Preferably, the blades are triangular or arc.

Preferably, the heating system further comprises cover heaters.

Preferably, the kettle body heater is a half-pipe coil and/or a jacket.

Preferably, a heating medium inlet is arranged on the reaction kettle.

Preferably, a thermal medium is introduced for heating; and the thermal medium is at least one member selected from a group consisting of steam, hot air, hot water, and conducting oil.

Preferably, a temperature measuring port is arranged on the reaction kettle.

Preferably, a pressure measuring port is arranged on the reaction kettle.

Compared with prior art, the present invention has following beneficial effects.

Firstly, the agitating device is able to uniformly mix the materials in the reaction kettle, and hollow structures of the agitating shaft and the blades enable the materials to be uniformly heated, so that the solid powders directly react in the reaction kettle without being pressed into blocks.

Secondly, the thermal medium is introduced into the kettle body of the reaction kettle for heating through the heating device, and the heating medium is introduced into the agitating shaft and blades in the kettle body, which obviously increases the heat transfer area and increases the reaction efficiency.

Thirdly, the heating medium can be directly introduced into the kettle body of the reaction kettle, which further increases the heat transfer capacity and the reaction efficiency.

Fourthly, the agitating shaft and the blades are driven to rotate by a drive motor and agitate the materials, so that the materials are uniformly heated and meanwhile the materials fully contact the heat transfer components, which increases the heat transfer rate.

Fifthly, the blades are triangular or arc, which obviously increases the heat transfer area.

Sixthly, the blades are uniformly arranged on the two sides of the agitating shaft at the angle of 40°-50° to the agitating shaft, which facilitates the materials to move back and forth.

Seventhly, an air discharging pipe is arranged on an upper part of a charging port. Before reaction, air in the kettle body is pumped out of the kettle body, so as to avoid an interference of the air to the reaction; and, after reaction is finished, steam in the reaction kettle is discharged through the air discharging pipe, so that a pressure in the reaction kettle becomes ordinary.

Eighthly, after reaction is finished, the materials in the reaction kettle can be dried in the reaction kettle, or moved out of the reaction kettle and then dried, which increases the use efficiency of the reaction kettle.

Ninthly, a thermometer mounting port, a piezometer mounting port, an observation port, a sampling port and a service port are arranged on the reaction kettle, so that a material situation in the reaction kettle can be observed, a technical process can be recorded and a process control can be adjusted at any time.

These and other objectives, features, and advantages of the present invention will become apparent from the following detailed description, the accompanying drawings, and the appended claims.

BRIEF DESCRIPTION OF THE DRAWINGS

To more clearly illustrate the technical solutions of the present invention, the drawing is simply introduced as follows.

The drawing is a structural sketch view of a solid powder reactor according to a first preferred embodiment of the present invention.

In the drawing: 1: reaction kettle steam inlet; 2: cover half-pipe coil inlet; 3: kettle body half-pipe coil inlet; 4: piezometer; 5: thermometer; 6: kettle body; 7: air discharging pipe; 8: charging port; 9: kettle body half-pipe coil; 10: cover half-pipe coil outlet; 11: kettle body half-pipe coil outlet; 12: support; 13: discharging port; 14: blades; 15: agitating shaft; 16: rotation joint; 17: sealing device; 18: drive motor; 19: observation port; 20: service port; and 21: sampling port.

DETAILED DESCRIPTION OF THE PREFERRED EMBODIMENT

With the accompanying drawing, the technical solutions and advantages of the present invention are described in detail as follows.

First Preferred Embodiment

As showed in the drawing, according to a first preferred embodiment of the present invention, a solid powder reactor is illustrated, comprising a reaction kettle and an agitating device, wherein: the reaction kettle comprises a kettle body 6 which is hollow and two covers; and the two covers are connected with the kettle body 6 through bolts for respectively sealing two ends of the kettle body 6.

The solid powder reactor further comprises a heating system, wherein: the heating system comprises a kettle body heater and cover heaters; the kettle body heater is a half-pipe coil arranged on an outer wall of the kettle body, wherein a half of the half-pipe coil is a transverse kettle body half-pipe coil which is parallel with a shaft axis of the kettle body, and the other half of the half-pipe coil is a longitudinal kettle body half-pipe coil which is vertical to the shaft axis of the kettle body; a kettle body half-pipe coil inlet 3 and a kettle body half-pipe coil outlet 11 are arranged on a kettle body half-pipe coil 9 which is namely the kettle body heater; a heating medium enters from the kettle body half-pipe coil inlet 3, then flows through the half-pipe coil, and finally flows out through the kettle body half-pipe coil outlet 11; the cover heaters are two half-pipe coils respectively arranged on an outer side of the two covers; a cover half-pipe coil inlet 2 and a cover half-pipe coil outlet 10 are arranged on each cover half-pipe coil namely the cover heater; and, the heating medium enters from the cover half-pipe coil inlet 2, then flows through the cover half-pipe coil, and finally flows out through the cover half-pipe coil outlet 10. According to the first preferred embodiment, the heating medium is steam, and steam is introduced into the kettle body half-pipe coil and the cover half-pipe coils, so as to heat the reaction kettle.

The agitating device comprises a drive motor 18, an agitating shaft 15 and blades 14, wherein: the agitating shaft 15 is arranged at a center of the reaction kettle; the agitating shaft 15 and the blades 14 are hollow and form an agitating heater; the drive motor 18 is connected with a first end of the agitating shaft 15, for driving the agitating shaft 15 to rotate clockwise; the blades 14 are triangular and uniformly arranged on two sides of the agitating shaft 15 at an angle of 40° to an axial direction of the agitating shaft; a rotation joint 16 is arranged at a second end of the agitating shaft 15, for introducing steam into the hollow agitating shaft 15 and blades 14; and, a sealing device 17 is arranged at a joint between the agitating shaft 15 and the reaction kettle, for sealing materials in the reaction kettle.

The reaction kettle is horizontally arranged and fixed on a support 12; a charging port 8 is arranged on an upper part of the kettle body of the reaction kettle; two discharging ports 13, two piezometers 4, two thermometers 5, a service port 20, an observation port 19 and a sampling port 21 are arranged on a lower part of the kettle body; an air discharging pipe 7 is arranged on the charging port 8; and a reaction kettle steam inlet 1 is arranged on the cover close to the rotation joint, so that steam is directly introduced into the reaction kettle from the reaction kettle steam inlet for heating.

Detailed application steps of the solid powder reactor are described as follows.

Before using, verifying that the charging port 8, the discharging port 13, the air discharging pipe 7, the sampling port 21 and the service port 20 are closed; introducing steam into the kettle body half-pipe coil 9 and the cover half-pipe coils, and preheating the reaction kettle; introducing steam into the hollow agitating shaft 15 and blades 14 from the rotation joint 16; starting the drive motor 18, the agitating shaft 15 moving clockwise and driving the blades 14 to rotate; observing a temperature in the reaction kettle through the thermometers 5, and preparing to load the materials after reaching a required process temperature in the reaction kettle.

Verifying again that the discharging port 13 is closed, opening the charging port 8, and gradually loading the solid materials to be reacted into the reaction kettle through the charging port 8; after finishing loading, closing the charging port 8; opening the air discharging pipe 7 on the charging port 8, pumping air in the reaction kettle out from the air discharging pipe 7 by a vacuum pump, then closing the air discharging pipe, and stopping pumping, wherein air in the reaction kettle is pumped out for preventing an interference of air to the production process.

Uniformly agitating the solid materials to be reacted by the agitating device, wherein the blades 14 for agitating are triangular so that a heat transfer area is obviously increased, and the blades 14 are uniformly arranged on the two sides of the agitating shaft at an angle of 40° to the agitating shaft 15, which facilitates the materials to move back and forth; introducing steam into the kettle body half-pipe coil 9 and the cover half-pipe coils on the reaction kettle and heating the reaction kettle, and introducing steam into the agitating shaft 15 and the blades 14, so that not only the materials are heated uniformly but also the materials fully contact the heat transfer components, which increases a heat transfer rate, obviously increases a heat transfer area, and increases a reaction efficiency.

A temperature of the solid materials in the reaction kettle gradually increasing, and observing the temperature of the solid materials in the reaction kettle through the thermometers 5; after reaching the required process temperature, opening the reaction kettle steam inlet 1, and introducing steam into the reaction kettle, wherein the steam is directly introduced into the kettle body of the reaction kettle, which further increases a heat transfer capacity and a reaction efficiency; observing the thermometers 5, and, when reaching a reaction temperature, starting timing and adjusting a steam flow in the heating system and the reaction kettle for temperature control, and controlling the temperature of the materials at the required process temperature; starting reaction with timing, and controlling a reaction time according to process requirements; during the reaction, monitoring values of the thermometers 5 and the piezometers 4, recording process, and adjusting the steam flow and an agitating frequency according to the process requirements, and meanwhile observing a situation of the materials in the reaction kettle through the observation port 19, wherein a sample of the materials is able to be taken out from the sampling port 21 during reaction, so as to observe a reaction degree of the solid materials.

After reaction of the solid materials is finished, opening the air discharging pipe 7 on the charging port 8, discharging steam in the reaction kettle, and a pressure in the reaction kettle becoming an ordinary pressure; discharging the materials after reaction from the discharging port 13, then transferring the materials to a drying machine and drying; and finally obtaining a product meeting requirements.

Second Preferred Embodiment

According to a second preferred embodiment, the present invention provides a solid powder reactor, comprising a reaction kettle and an agitating device, wherein: the reaction kettle comprises a kettle body which is hollow and two covers; and the two covers are connected with the kettle body through bolts, for respectively sealing two ends of the kettle body.

The solid powder reactor further comprises a heating device, wherein: the heating device comprises a kettle body heater and cover heaters; the kettle body heater is a jacket arranged on an outer wall of the kettle body, and a jacket inlet and a jacket outlet are arranged on the jacket; the cover heaters are two half-pipe coils, respectively arranged on an outer side of the two covers, and a half-pipe coil inlet and a half-pipe coil outlet are arranged on each half-pipe coil; the heating device heats the kettle body and the covers through conduction oil, wherein the conduction oil is introduced into the jacket for heating the kettle body, and the conduction oil is introduced into the half-pipe coils for heating the covers, so as to simultaneously rise a temperature of the reaction kettle.

The agitating device comprises a drive motor, an agitating shaft and blades, wherein: the agitating shaft is arranged at a center of the reaction kettle; the agitating shaft and the blades are hollow and form an agitating heater; the drive motor is connected with a first end of the agitating shaft, so as to drive the agitating shaft to rotate clockwise; the blades are arc and uniformly arranged on two sides of the agitating shaft at an angle of 50° to an axial direction of the agitating shaft; a rotation joint is arranged at a second end of the agitating shaft, for introducing conduction oil into the hollow agitating shaft and blades; and a mechanical seal is arranged at a joint between the agitating shaft and the reaction kettle.

The reaction kettle is horizontal arranged and fixed on a support. A charging port is arranged on an upper part of the kettle body of the reaction kettle; a discharging port, a piezometer, a thermometer, a service port, an observation port and a sampling port are arranged on a lower part of the kettle body; and an air discharging pipe is arranged on the charging port. A reaction kettle thermal medium inlet is arranged on the cover close to the rotation joint, and steam is directly introduced into the reaction kettle from the reaction kettle thermal medium inlet for heating, wherein a steam pressure is 1.0 MPa.

Detailed application steps of the solid powder reactor are described as follows.

Before using, verifying that the charging port, the discharging port, the air discharging pipe, the sampling port and the service port are closed; introducing conduction oil into the jacket and the half-pipe coils, and preheating the reaction kettle; introducing conduction oil into the hollow agitating shaft and blades from the rotation joint; starting the drive motor, and the agitating shaft rotating anticlockwise and driving the blades to rotate; observing a temperature in the reaction kettle through the thermometer, and, after reaching a required process temperature, preparing to load materials.

Verifying again that the discharging port is closed, opening the charging port, and gradually loading the solid materials to be reacted into the reaction kettle through the charging port; after finishing loading, closing the charging port; opening the air discharging pipe on the charging port, pumping air in the reaction kettle out from the air discharging pipe by a vacuum pump, then closing the air discharging pipe, and stopping pumping.

Uniformly agitating the solid materials to be reacted by the agitating device; a temperature of the solid materials in the reaction kettle gradually rising; observing the temperature of the solid materials in the reaction kettle through the thermometer; after reaching the required process temperature, opening the reaction kettle thermal medium inlet, and introducing steam with a pressure of 1.0 MPa into the reaction kettle; observing the thermometer, and, when reaching a reaction temperature, starting timing and adjusting conduction oil in the heating system and a steam flow in the reaction kettle for temperature control, and controlling the temperature of the materials at the required process temperature; starting reaction with timing, and controlling a reaction time according to process requirements; during the reaction, monitoring values of the thermometer and the piezometer, recording process, and adjusting the steam flow and an agitating frequency according to the process requirements, and meanwhile observing a situation of the materials in the reaction kettle through the observation port, wherein a sample of the materials is able to be taken out from the sampling port during reaction, so as to observe a reaction degree of the solid materials.

After reaction of the solid materials is finished, closing the reaction kettle thermal medium inlet, opening the air discharging pipe, and discharging steam in the reaction kettle; introducing conduction oil into the heating system, rising a temperature of the reaction kettle, and drying the materials in the reaction kettle; controlling a drying temperature, taking a sample of the materials out from the sampling port, and observing a drying degree; after finishing drying, discharging the materials after reaction from the discharging port, and obtaining a product meeting requirements.

Third Preferred Embodiment

The third preferred embodiment is different from the above preferred embodiments in that: the kettle body heater is a half-pipe coil, and the cover heaters are jackets; the thermal medium is hot water; the heating medium in the reaction kettle is steam with a pressure of 1.1 MPa; and, the blades are triangular and at an angle of 41° to the agitating shaft.

The detailed application steps of the solid powder reactor refer to the above preferred embodiments.

Fourth Preferred Embodiment

The fourth preferred embodiment is different from the third preferred embodiment in that: the kettle body heater is a half-pipe coil, and the cover heaters are half-pipe coils; the thermal medium is hot air; the heating medium in the reaction kettle is steam with a pressure of 1.2 MPa; and, the blades are arc and at an angle of 42° to the agitating shaft.

Fifth Preferred Embodiment

The fifth preferred embodiment is different from the fourth preferred embodiment in that: the kettle body heater is a jacket, and the cover heaters are jackets; the thermal medium is steam with a pressure of 1.0 MPa; the heating medium in the reaction kettle is steam with a pressure of 1.0 MPa; and, the blades are triangular and at an angle of 43° to the agitating shaft.

Sixth Preferred Embodiment

The sixth preferred embodiment is different from the fifth preferred embodiment in that: the kettle body heater is a jacket, and the cover heaters are half-pipe coils; the thermal medium is steam with a pressure of 1.3 MPa; the heating medium in the reaction kettle is steam with a pressure of 1.3 MPa; and, the blades are arc and at an angle of 44° to the agitating shaft.

Seventh Preferred Embodiment

The seventh preferred embodiment is different from the sixth preferred embodiment in that: the kettle body heater is a half-pipe coil, and the cover heaters are half-pipe coils; the thermal medium is steam with a pressure of 1.5 MPa; the heating medium in the reaction kettle is steam with a pressure of 1.5 MPa; and, the blades are triangular and at an angle of 45° to the agitating shaft.

Eighth Preferred Embodiment

The eighth preferred embodiment is different from the seventh preferred embodiment in that: the kettle body heater is a half-pipe coil, and the cover heaters are half-pipe coils; the thermal medium is conduction oil having a temperature of 400°; the heating medium in the reaction kettle is steam with a pressure of 1.7 MPa; and, the blades are arc and at an angle of 46° to the agitating shaft.

Ninth Preferred Embodiment

The ninth preferred embodiment is different from the eighth preferred embodiment in that: the kettle body heater is a half-pipe coil, and the cover heaters are jackets; the thermal medium is conduction oil having a temperature of 350°; the heating medium in the reaction kettle is steam with a pressure of 1.6 MPa; and, the blades are triangular and at an angle of 47° to the agitating shaft.

Tenth Preferred Embodiment

The tenth preferred embodiment is different from the ninth preferred embodiment in that: the kettle body heater is a jacket, and the cover heaters are half-pipe coils; the thermal medium is conduction oil having a temperature of 300°; the heating medium in the reaction kettle is steam with a pressure of 1.4 MPa; and, the blades are arc and at an angle of 48° to the agitating shaft.

Eleventh Preferred Embodiment

The eleventh preferred embodiment is different from the tenth preferred embodiment in that: the kettle body heater is a half-pipe coil, and the cover heaters are half-pipe coils; the thermal medium is conduction oil having a temperature of 250°; the heating medium in the reaction kettle is steam with a pressure of 1.1 MPa; and, the blades are triangular and at an angle of 49° to the agitating shaft.

Twelfth Preferred Embodiment

The twelfth preferred embodiment is different from the eleventh preferred embodiment in that: the kettle body heater is a half-pipe coil, and the cover heaters are half-pipe coils; the thermal medium is conduction oil having a temperature of 200°; the heating medium in the reaction kettle is steam with a pressure of 0.9 MPa; and, the blades are arc and at an angle of 50° to the agitating shaft.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A solid powder reactor, comprising:
   a reaction kettle, comprising a kettle body which is hollow and two covers;
   an agitating device, comprising an agitating shaft and blades, wherein: the agitating shaft is arranged in the hollow kettle body; and the blades are fixed on the agitating shaft; and
   a heating system, comprising a kettle body heater and an agitating heater, wherein: the kettle body heater is fixed on the hollow kettle body; and the agitating heater is arranged on the agitating device;
   wherein: while the agitating device and the hollow kettle body are driven to agitate by a driving device fixedly arranged outside the reaction kettle, the heating system heats materials inside the reactor;
   wherein the agitating shaft and the blades are hollow, for introducing a heating medium thereinto; and wherein: the blades are uniformly arranged on two sides of the agitating shaft at an angle of 40°-50° to an axial direction of the agitating shaft.

2. The solid powder reactor, as recited in claim 1, wherein the blades are triangular or arc.

3. The solid powder reactor, as recited in claim 2, wherein the heating system further comprises cover heaters.

4. The solid powder reactor, as recited in claim 3, wherein the kettle body heater is a half-pipe coil and/or a jacket.

5. The solid powder reactor, as recited in claim 4, wherein a heating medium inlet is arranged on the reaction kettle.

6. The solid powder reactor, as recited in claim 5, wherein: a thermal medium is introduced for heating; and, the thermal medium is at least one member selected from a group consisting of steam, hot air, hot water, and conduction oil.

7. The solid powder reactor, as recited in claim 4, wherein a temperature measuring port is arranged on the reaction kettle.

8. The solid powder reactor, as recited in claim 7, wherein a pressure measuring port is arranged on the reaction kettle.

9. The solid powder reactor, as recited in claim 1, wherein the heating system further comprises cover heaters.

10. The solid powder reactor, as recited in claim 9, wherein the kettle body heater is a half-pipe coil and/or a jacket.

11. The solid powder reactor, as recited in claim 10, wherein a heating medium inlet is arranged on the reaction kettle.

12. The solid powder reactor, as recited in claim 11, wherein: a thermal medium is introduced for heating; and, the thermal medium is at least one member selected from a group consisting of steam, hot air, hot water, and conduction oil.

13. The solid powder reactor, as recited in claim 10, wherein a temperature measuring port is arranged on the reaction kettle.

14. The solid powder reactor, as recited in claim 13, wherein a pressure measuring port is arranged on the reaction kettle.

* * * * *